United States Patent [19]
Gunther
[11] 4,003,312
[45] Jan. 18, 1977

[54] PREPARING WATERLESS LITHOGRAPHIC PRINTING MASTERS BY INK JET PRINTING

[75] Inventor: Wolfgang H. H. Gunther, Webster, N.Y.

[73] Assignee: Xerox Corporation, Stamford, Conn.

[22] Filed: Dec. 16, 1974

[21] Appl. No.: 533,035

[52] U.S. Cl. .......... 101/466; 101/401.1; 156/306; 346/75; 427/144; 427/258; 427/387

[51] Int. Cl.² .......... B41C 1/10; G01D 15/18

[58] Field of Search .......... 101/466, 401.1; 156/306, 272; 346/75; 427/144, 258, 387, 288

[56] References Cited

UNITED STATES PATENTS

| | | | |
|---|---|---|---|
| 2,037,825 | 4/1936 | Salfisberg | 101/25 X |
| 2,512,743 | 6/1950 | Hansell | 101/401.1 |
| 2,785,081 | 3/1957 | Babiarz et al. | 101/32 |
| 3,179,546 | 4/1965 | Fischer | 156/272 |
| 3,510,340 | 5/1970 | Blake et al. | 427/288 |
| 3,694,241 | 9/1972 | Guthrie et al. | 427/288 |
| 3,775,115 | 11/1973 | Sorkin et al. | 101/457 |

FOREIGN PATENTS OR APPLICATIONS

| | | | |
|---|---|---|---|
| 953,708 | 3/1964 | United Kingdom | 101/401.1 |
| 483,228 | 4/1938 | United Kingdom | 101/401.1 |

*Primary Examiner*—Clyde I. Coughenour
*Attorney, Agent, or Firm*—James J. Ralabate; James P. O'Sullivan; Donald M. MacKay

[57] ABSTRACT

Novel means for preparing waterless lithographic printing masters by ink jet imaging means are provided. A master is provided by depositing a silicone or other material which can be rendered ink releasing on a suitable master substrate by means of an ink jet printing apparatus, and curing the silicone to an elastomeric ink releasing condition. Alternatively, an ink jet printing apparatus can be employed to deposit in image configuration, a catalyst to an uncured silicone on a master substrate, a photopolymer to a cured silicone on a master substrate which photopolymer can be cured to combine with the silicone, or an imaging light insensitive shadow fluid to a light sensitive curable silicone coated on a master substrate whereby the background nonimaged areas can be cured and the shadow fluid and underlying silicone removed to reveal the ink accepting substrate.

1 Claim, 2 Drawing Figures

PREPARING WATERLESS LITHOGRAPHIC PRINTING MASTERS BY INK JET PRINTING

BACKGROUND OF THE INVENTION

Ink jet printing techniques have recently been suggested for duplicating and printing operations which have several advantages over more conventional methods. For example, an optical system is not required which is often expensive and requires a large amount of space in the machine. Secondly, a pictorial optical input is not required as the graphic information is assembled on a point by point or scan line by scan line basis, electrical or other discrete stimuli substituting for the pictorial optical input. Thirdly, the information guiding the ink jet array is storable and may be transmitted over distances. Fourthly, it is possible to create original documents as distinct from reproduction of existing graphic information. There are some drawbacks, however. Once a document has been created at some cost of time and instrumental sophistication, multiple copies require that the same process be repeated over and over all the while holding the guiding information in a memory bank and using the electrical circuits to the fullest. Further, to permit high speed operation, rather coarse scan patterns have to be followed, thus sacrificing quality for speed. It is now been discovered that the advantages of ink jet printing can be realized and the disadvantages obviated by using the technique to prepare a printing master rather than the ultimate copy. In this manner, the ink jet printing procedure need not be repeated over and over to make copies thereby limiting the output, but the master can be made more easily and faster than conventional master methods.

BRIEF DESCRIPTION OF THE INVENTION

Briefly, the invention comprises forming an image with an ink jet printing apparatus which comprises discharging the imaging fluid from as droplets and depositing it on an imaging surface in response to electrical signals which comprise an information pattern. In this manner, the droplets are selectively emitted or deflected in accordance with an information source. In one embodiment an uncured silicone curable to an ink releasable condition is deposited on an ink accepting master substrate and the silicone cured to an ink releasable condition. By varying the polarity of the incoming video signal, the imaging material can be deposited to form an image either positive or negative in sense. In a second embodiment, a catalyst is deposited in image configuration on an uncured silicone, the silicone cured in image configuration and the uncured silicone removed in the nonimaged areas. Alternatively, a photocurable material which can combine with a cured silicone can be deposited in image configuration on said silicone and the plate subjected to light to bond the imaging material thereto. A further embodiment is to deposit a light insensitive shadow fluid on a light sensitive curable silicone, expose the plate to blanket illumination to cure the background nonimaged areas and remove the uncured silicone beneath the light insensitive shadow fluid. In addition, an ink-accepting imaging polymer or prepolymer can be applied to an adhesive elastomer such as a silicone, which has sites for the covalent attachment of the imaging material, and the materials chemically bonded to one another.

DETAILED DESCRIPTION OF THE INVENTION

Figure 1:
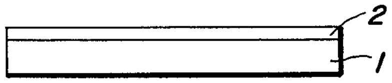
FIG. 1 is a side view of the printing master of the invention.

The types of materials and methods by which the invention can be achieved will now be discussed in detail.

Substrates which can be employed to prepare the printing master are self-supporting materials to which the silicone can be adhered and which possess sufficient heat and mechanical stability to permit use under widely varying printing and handling conditions, and which are preferably ink accepting. Exemplary of suitable materials are paper; metals such as aluminum; and plastics such as polyester, polycarbonate, polysulfone, nylon and polyurethane.

The silicone gums which can be employed to coat the substrate are the conventional types employed heretofore in waterless lithography, which have reactive crosslinking sites or are capable of being cured to an ink releasable elastomeric condition. Exemplary of suitable silicone gums are those having only methyl containing groups in the polymer chain such as polydimethylsiloxane; gums having both methyl and phenyl containing groups or halogenated phenyl and methyl groups in the polymer chain as well as gums having both methyl and vinyl groups, methyl and fluorine groups, or methyl, phenyl and vinyl groups in the polymer chain with not more than about 5 percent of the total non-Si-O-groups being vinyl, phenyl, or halogenated vinyl or phenyl. Typical pendant groups through which crosslinking can occur include vinyl, hydroxyl, amino, isocyanate and thioisocyanate groups.

Typical silicone gums suitable for use in the invention are thermally curable gums, having amino alkane crosslinking sites in the polymer backbone, sold by Union Carbide Corporation under the designation Y-3557 and Y-8053 silicone gums.

In addition to the polysiloxane homopolymers, other adhesive materials can be employed in the invention. For example, block copolymers can be employed prepared from a silicone such as one of the aforesaid homopolymers and a second component such as a vinyl polymer. Typical vinyl polymers include poly(styrene); poly(alpha-methylstyrene); and poly(N-vinylcarbazole). A preferred block copolymer comprises 10 percent poly(alpha-methylstyrene) and 90 percent poly(dimethylsiloxane) in a suitable solvent or mixture of solvents such as a mixture of 20 percent xylene and 80 percent dodecane. Typically the block copolymer would constitute from between about 1 and about 5 percent by weight of the total solvent.

Another adhesive or ink releasing material which can be employed is a terpolymer formed from ethylene and propylene crosslinked with a minor amount of a diene such as 1,4-hexadiene. A conventional peroxide catalyst such as benzoyl peroxide or dicumyl peroxide can be employed and the unreacted mixture dispensed from an ink jet printing apparatus from a suitable solvent such as hexane, pentane or cyclohexane. The polymer can then be formed by activating the catalyst such as by heat. For convenience, the following disclosure will describe the invention with reference to adhesive silicones, it being understood that other adhesive materials can be substituted for said silicones.

Any conventional ink jet printing apparatus can be employed in which the imaging fluid is discharged and deposited as droplets on an imaging surface in response to electrical signals which comprise an information pattern. Suitable devices are described in U.S. Pat. Nos. 3,465,350; 3,465,351; 3,805,273; 3,673,601; 3,683,212; 3,582,954; 3,060,429; 3,747,120; and British Pat. No. 1,042,308.

In preparing the printing master, a suitable adhesive material such as a silicone gum as described, containing pendant reactive groups suitable for crosslinking reactions, is preferably blended with a blocking agent (capping or complexing agent) to convert the gum to a nontacky elastomeric but uncured condition. A variety of blocking agents can be employed by conventional methods. For example, gums having pendant amino groups can be reacted with (a) an organohalosilane to form a silylamine, (b) an organodiisothiocyanate silane to form a silylthiourea, (c) an organoisocyanate to form a urea, (d) phosgene to form an isocyanate group which can then be blocked with an oxime, (e) a hydroxyorganoaldehyde to form an anil and (f) an organoisothiocyanate to form a thiourea. Similarly, silicone gums containing pendant hydroxyl groups can be reacted with an isocyanate to form a urethane; gums with pendant isocyanate groups can be reacted with a diamine to form a urea and gums with thioisocyanate groups can be reacted with a diamine to form a thiourea. A variety of solvents can be employed for reaction between the blocking agent and the silicone gum. It is only necessary that the reactants be at least partially soluble therein. Exemplary of typical solvents are toluene, benzene, tetrahydrofuran, dimethylsulfoxide, dimethylfuran, chlorobenzene, dioxime, chloroform, trichloroethylene and the like.

In a preferred embodiment, a crosslinking agent is incorporated into the silicone gum-solvent solution after the reactive pendant groups of the gum have been blocked. The crosslinking agent must be one which is unreactive at low temperature or it must be blocked so that it is stable at low temperature. Typical blocked crosslinking agents are the phenol and oxime adducts of diisocyanates. Typical diisocyanates are toluene-2,4-diisocyanate, 4,4'-diisocyanato-diphenylmethane, 4,4'-diisocyanato-3,3'-dimethylbiphenyl, poly(m-methylene-p-isocyanatotoluene), hexamethylene diisocyanate, bis(2-isocyanato ethyl)-fumarate and tris(-2,isocyanatoethyl)trimellitate. Typical blocking agents include alcohols such as ethanol; phenols such as phenol; silanols such as trimethylsilanol and oximes such as acetone oxime.

The blocked isocyanates are prepared by simply mixing together the blocking agent and polyisocyanate and if necessary, warming the mixture gently for a short period of time. A mutual solvent is preferably employed and to avoid the presence of any free isocyanate groups, it is advisable to employ a slight excess of the blocking agent.

The blocked silicone-solvent solution which may contain a crosslinking agent is then coated upon a suitable substrate by means of a conventional ink jet apparatus (e.g., A. B. Dick Video Jet Printer) or conventional means such as draw bar or spray coating (the coating depending upon the particular imaging procedure employed) and the silicone film allowed to dry. Drying can be conveniently conducted at room temperature or slightly elevated temperature, to evaporate the solvent. Elevated temperatures can be used when curing is desired.

Figure 2:
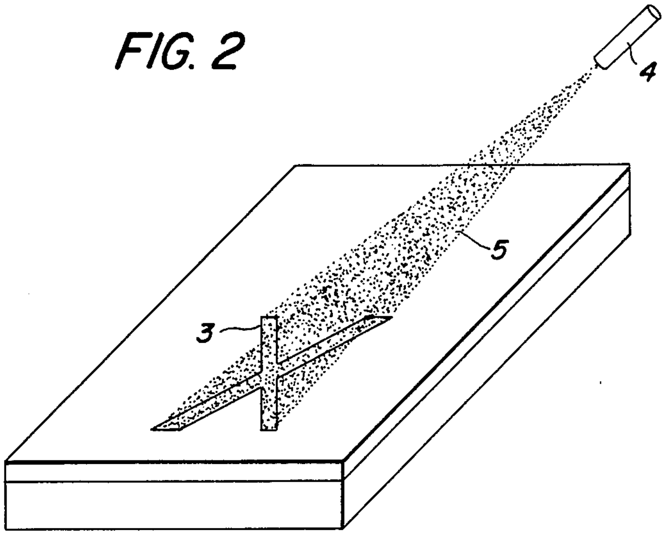
FIG. 2 is a top view with an image being formed by an ink jet printing apparatus.

Referring now to the drawings, FIG. 1 depicts a side view of a printing master of the invention in which 1 is the substrate and 2 a surface material which can be rendered ink releasing such as a silicone curable to an elastomeric ink releasable condition. In FIG. 2 a top view of the printing master is shown wherein 3 is an image, 4 the orifice of an ink jet printing apparatus and droplets 5 are discharged from said orifice to form the image.

When the silicone is applied to the master substrate in image configuration by means of an ink jet printing apparatus, it may be necessary to dilute the silicone gum solution to a viscosity of conventional ink jet printing inks or generally to a concentration of between about 0.5 and 5 percent by weight silicone gum solids. Depending upon the conductivity of the materials employed, it may also be necessary to add a conductivity agent such as a tetraalkylammonium salt in order to permit the droplets to be given a charge in those ink jet systems requiring charged ink.

Alternatively, the silicone can be applied to the master substrate by conventional means such as draw bar coating and a catalyst deposited in image configuration by means of an ink jet printing apparatus, the silicone cured in the imaged areas and the uncured nonimage silicone removed such as by washing with a suitable solvent such as toluene.

Another method of forming the master is to coat a suitable silicone on a master substrate, cure the silicone and then image the silicone by depositing in image configuration a curable ink-accepting polymer and curing said polymer. Preferably the materials are selected so that a grafting reaction occurs, which generates chemical bonds between the silicone and imaging polymer.

Another method of forming the master is to coat a suitable silicone on a master substrate, cure the silicone and then image the silicone by depositing in image configuration a photocurable polymer by means of an ink jet printing apparatus which photopolymer will combine with the cured silicone and be ink accepting in the imaged areas. Exemplary of suitable photopolymers are organic azides which upon the action of light or heat form reactive intermediates called nitrenes which can partially undergo insertion into carbonhydrogen, nitrogen-hydrogen or oxygen-hydrogen bonds as well as form crosslinks with adjacent polymer chains. A typical commercial material is Photozid, sold by Upjohn Company.

Another embodiment of this invention is to apply a light sensitive curable silicone to a master substrate and image the silicone with a light absorbing but non-photosensitive shadow fluid (e.g. a 2 percent solution of methyl salicylate in iso-propanol) by means for an ink jet printing apparatus followed by blanket illumination of the silicone and removal of the shadow fluid and uncured silicone beneath it by conventional means such as washing with a suitable solvent.

Exemplary of suitable organic polysiloxanes which can be cured by means of light or electron beams are described in German OLS 2,207,495, which is herein incorporated by reference in its entirety. Polymers disclosed therein are derived from at least one organopolysiloxane such as polydimethylsiloxane with an unsaturated residue of the following structure:

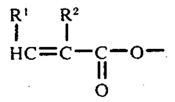

wherein $R^1$ can be hydrogen or a halogen substituted phenyl residue while $R^2$ is hydrogen or a methyl residue. The unsaturated side chain may be based on acryloxy, methacryloxy, cinnamoloxy, or halogenated cinnamoyloxy residues. An inhibitor to thermal polymerization as well as a sensitizer to specific electromagnetic radiation can be incorporated therein.

The viscosity of fluids discharged by the ink jet printing apparatus can be that of typical ink jet printing inks. Typically a viscosity of that of about water up to about 200 centipoises can be employed, depending upon the materials and type of apparatus employed.

The silicone masters are ink releasing in the nonimaged areas and can thus be employed on a direct or offset printing press with conventional inks to provide prints over a long period of operation, without the requirement of a fountain solution.

The following examples are illustrative of the invention and preferred embodiments. All parts and percentages in said examples and elsewhere in the specification and claims are by weight unless otherwise specified.

EXAMPLE I

A printing master is prepared and prints made therefrom as follows. Thirty grams of a 1 weight percent solution of poly(dimethyl siloxane) silicone gum (Union Carbide Y-3557) in benzene (which has 0.5 weight percent of aminobutylmethylsiloxane comonomer units and a molecular weight from 200,000 to 500,000) is mixed with 0.004 gram of dimethyl dichlorosilane (capping agent in an amount excess to the pendant amino groups of the silicone gum) and blended by stirring in an open beaker. To this mixture is added 0.06 gram of a 5 weight percent solution in tetrahydrofuran of the acetone oxime adduct of toluene-2,4-diisocyanate. The resultant solution is then employed in an ink jet printing nozzle like that shown in FIG. 1 of U.S. Pat. No. 3,747,120. The nozzle is mounted in a Xerox telecopier apparatus which translates the nozzle sequentially relative to the imaging surface. The information signal is transmitted from another Xerox telecopier which is scanning the document to be reproduced. The imaging solution is deposited on a 10 × 15 inch brushed aluminum sheet to form an image negative in sense. The coated sheet is then placed in an air oven maintained at 175° C and placed in intimate contact with a metal shelf of the oven. After a period of 5 minutes, the sheet is removed from the oven and allowed to cool to room temperature. The silicone coating is found to have been converted to a tough highly elastomeric polymer. The plate is then mounted on a Davidson Duo Lithographic printing press inked with VanSon 10850 rubber based ink and excellent prints obtained therefrom without the use of a fountain or dampening solution.

EXAMPLE II

In accordance with the general procedure of Example I, a free radical curable organopolysiloxane prepared from acryloxypropyl trichlorosilane and polydimethylsiloxane, according to the method of German OLS 2,207,495, page 33, is deposited as a one weight percent solution in toluene on a master substrate containing a free radical source. The master substrate is prepared by dissolving benzoyl peroxide in toluene, the mixture coated on a brushed aluminum sheet and the solvent allowed to dry. The silicone, which is deposited in image configuration in the nonimaged areas, is then cured by heat and excellent prints are obtained from the master in accordance with the procedure of Example I.

EXAMPLE III

In accordance with the general procedure of Example I, a printing master is prepared and excellent prints made therefrom employing a paper master substrate (A. B. Dick 3000) and a polydimethylsiloxane having pendant butylnaphthylureido sites prepared by the reaction of naphthylisocyanate and Union Carbide Y-3557 gum.

EXAMPLE IV

In accordance with the general procedure of Example I, a printing master is prepared and excellent prints made therefrom employing a polydimethylsiloxane elastomer having pendant butyltriphenylsilylimino sites prepared by the reaction of chlorotriphenylsilane and Union Carbide Y-3557 gum.

EXAMPLE V

A printing master is prepared as follows. A 10 weight percent solution of the siloxane of Example I with capped pendant sites and a blocked diisocyanate curing agent is draw bar coated on a brushed aluminum sheet to a thickness of five microns. The resultant master is then imaged by depositing a reactive polymer in tetrahydrofuran in image configuration from the apparatus of Example I. The toner is prepared by reacting 117.5 grams (0.289 equivalent monomers units) of a random free radical copolymer consisting of 71.8 mole percent styrene and N-butyl methacrylate, 41.0 grams (0.350 mole) 6-aminohexanol and 39.3 grams (0.350 mole) 1,4-diazabicyclo [2.2.2]octane (DABCO). The mixture is agitated under dry nitrogen at a temperature of approximately 190° C and n-butanol collected from a condenser. The toner is purified by quenching in 10 percent hydrochloric acid, dissolving in tetrahydrofuran followed by adding 10 percent hydrochloric acid and removing the liquid phase by decanting it from the gummy polymer. This is repeated several times and the sample dried under reduced pressure. After ink jet deposition, the resultant master is then heated to graft the toner to the silicone substrate and excellent prints obtained therefrom according to the general procedure of Example I.

EXAMPLE VI

A printing master is prepared as follows. Thirty grams of a 10 weight percent solution of poly(dimethyl siloxane) silicone gum (Union Carbide Y-3557) in benzene (which has 1.5 weight percent of aminobutylmethylsiloxane [comonomer units] and a molecular weight from 200,000 to 500,000) is mixed with 0.6 gram of a 5 weight percent solution in tetrahydrofuran of the acetone oxime adduct of toluene-2,4-diisocyanate. The resultant solution is draw bar coated on a 10 × 15 inch aluminum sheet and the solvent allowed to evaporate by maintaining the coated sheet at room temperature for 1 hour. The plate is then placed in an air oven for 2 minutes at 180° C to cure the silicone to an elastomeric ink releasing condition. The plate is removed from the oven, allowed to cool to room temperature and imaged with a 20 weight percent acetone solution of Photozid (Upjohn Co.) light sensitive polymer employing the printer of Example I. The coating is allowed to air dry. After the coat is dry, the plate is subjected to light from a mercury lamp for several minutes to cure and chemically bond the image coating to the silicone. The plate is then mounted on a printing press in accordance with the general procedure of Example I and excellent prints obtained therefrom without the use of any fountain or dampening solution.

EXAMPLE VII

A printing master is prepared and prints made therefrom as follows. Thirty grams of a 10 weight percent solution of poly(dimethyl siloxane) silicone gum (Union Carbide W-982) in benzene (which has 0.02 weight percent of methylvinylsiloxane [comonomer units] and a molecular weight from 200,000 to 500,000) is draw bar coated on a 10 × 15 inch aluminum sheet. The plate is then imaged with a 1% solution of dialkyl peroxide (Lupersol 101) employing an A. B. Dick Videojet printer. The plate is then placed in an air oven for 2 minutes at 180° C to cure the silicone to an elastomeric ink releasing condition in the imaged areas. The uncured nonimaged areas are then removed by washing the plate with acetone. After allowing the plate to dry, the plate is mounted on a Davidson Duo Lithographic printing press and excellent prints obtained therefrom employing a conventional ink and no dampening or fountain solution.

EXAMPLE VIII

A printing master is prepared as follows. A solution containing 6.6 grams poly(ethylene-propylene-1,4-hexadiene) (63%, 33% and 4% respectively) and 2,3 grams of 1,1-bis(t-butyl peroxy)-3,3,5-trimethyl cyclohexane in 200 grams of cyclohexane is deposited on a brushed aluminum sheet in accordance with the procedure of Example I. The solvent is allowed to dry and the polymer cured to an elastomeric ink releasable condition by heat in the absence of air at 140° C for 2 hours.

EXAMPLE IX

A printing master is made as follows. A block copolymer of 50% by weight polydimethylsiloxane and 50% polystyrene is blended with an equal amount of an organopolysiloxane prepared from acryloxypropyltrichlorosilane and dihydroxydimethylsilicone containing 0.5 weight percent hydroquinone sensitizer. The mixture is dissolved in toluene and coated onto a degreased aluminum plate to a thickness of 8 to 10 microns when dried. The plate is dried for 10 minutes at 80° C to evaporate the solvent. The plate is then imaged by depositing a light insensitive shadow fluid of a 2% solution of methyl salicylate in iso-propanol, employing a Videojet Printer. The plate is then permanently cross-linked by subjecting it to a high intensity lamp at short distance followed by removal of the uncured silicone under the imaging insensitive fluid by washing with toluene.

EXAMPLE X

An aluminum master substrate having an elastomeric ink releasing polysiloxane layer, is imaged with the siloxane of Example I employing the ink jet printer, and the resultant master dusted with a particulate toner comprising styrene/n-butyl methacrylate while the imaging silicone is uncured. The master is then heated to cure the imaging silicone and bond the ink-accepting toner image thereto. Excellent prints are obtained when the master is employed on a printing press.

EXAMPLE XI

The general procedure of Example I is repeated but for the exception that the adhesive material employed is formed from a 2.5% solution of 10% poly(alpha-methylstyrene) copolymerized with 90% poly(dimethylsiloxane) in a solvent mixture of 80% dodecane and 20% xylene; and the solvent allowed to evaporate.

EXAMPLE XII

An aluminum master substrate is coated with the copolymer of Example XI and imaged, after evaporation of the solvent, with a solution of 5% alpha-methylstyrene in xylene employing the ink jet printing apparatus of Example I. After the solvent is allowed to evaporate, the master is inked and excellent prints made therefrom.

Having described the invention with reference to these specific embodiments, it is to be understood that numerous variations can be made without departing from the spirit of the invention, and it is intended to encompass such reasonable variations or equivalents within its scope.

What is claimed is:

1. A process for preparing a printing master comprising coating a master substrate with a silicone curable to an elastomeric adhesive ink releasing condition, said silicone having reactive pendant groups, selectively imaging the resultant coated substrate by discharging an imaging fluid from an ink jet printing apparatus as droplets by selectively emitting or deflecting said droplets in accordance with an information source wherein the imaging fluid is an ink-accepting material having groups reactive with the silicone pendant groups, curing the silicone to an adhesive ink releasing condition, and grafting the imaging material to said silicone.

* * * * *